(12) United States Patent
Honta

(10) Patent No.: US 8,179,953 B2
(45) Date of Patent: May 15, 2012

(54) MOBILE STATION APPARATUS AND TRANSMISSION CHANNEL ESTIMATION METHOD

(75) Inventor: Mitsuo Honta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 736 days.

(21) Appl. No.: 12/276,902

(22) Filed: Nov. 24, 2008

(65) Prior Publication Data

US 2009/0262844 A1 Oct. 22, 2009

(30) Foreign Application Priority Data

Apr. 16, 2008 (JP) .................................. 2008-106572

(51) Int. Cl.
 *H04B 3/46* (2006.01)
 *H04B 17/00* (2006.01)
 *H04Q 1/20* (2006.01)

(52) U.S. Cl. ...................... 375/224; 375/350; 455/226.1

(58) Field of Classification Search .................. 375/224, 375/285, 346, 350; 455/67.16, 226.1, 296; 342/99, 101; 708/290, 313
See application file for complete search history.

(56) References Cited

U.S. PATENT DOCUMENTS

| | | | |
|---|---|---|---|
| 7,433,433 B2* | 10/2008 | Wilhelmsson et al. | 375/350 |
| 2005/0105647 A1* | 5/2005 | Wilhelmsson et al. | 375/316 |
| 2007/0121538 A1 | 5/2007 | Ode et al. | |
| 2009/0042530 A1* | 2/2009 | Wang et al. | 455/334 |
| 2010/0226453 A1* | 9/2010 | Wang et al. | 375/260 |
| 2011/0096751 A1* | 4/2011 | Ma et al. | 370/331 |

FOREIGN PATENT DOCUMENTS

JP 2007-150971 6/2007

* cited by examiner

*Primary Examiner* — Jean B Corrielus
(74) *Attorney, Agent, or Firm* — Katten Muchin Rosenman LLP

(57) ABSTRACT

A disclosed mobile station apparatus, which receives a downlink signal including pilots, includes a first estimation unit configured to estimate a delay spread of a transmission channel and a Doppler frequency based on the downlink signal; a determination unit configured to determine, based on the delay spread and the Doppler frequency, an interpolation method to be applied to the pilots; and a second estimation unit configured to perform interpolation using the interpolation method to estimate the transmission channel.

9 Claims, 13 Drawing Sheets

MOBILE STATION APPARATUS AND TRANSMISSION CHANNEL ESTIMATION METHOD

CROSS-REFERENCE TO RELATED APPLICATIONS

This application is based upon and claims the benefit of priority of Japanese Patent Application 2008-106572, filed on Apr. 16, 2008, the entire contents of which are hereby incorporated herein by reference.

FIELD

The disclosures herein are directed to a radio communications system, and in particular to a mobile station apparatus and a transmission channel estimation method.

BACKGROUND

In a radio communications system in which OFDM (Orthogonal Frequency Division Multiplexing) technology, for example, is used in a digital modulation scheme, a transmission channel is estimated using pilot signals (pilots). The pilots are known to both transmitting and receiving ends.

FIG. 1 shows an example of an arrangement of pilots. In FIG. 1, pilots are mapped in resource elements indicated by hatching. In resource elements other than the hatched ones, data are mapped. A resource element here is defined as a radio resource indicated by one subcarrier and one symbol.

A mobile station apparatus makes transmission channel estimates of resource elements in which pilots are mapped, using an equalization scheme. Examples of the equalization scheme are Zero Forcing Equalization and MMSE (Minimum Mean Square Error). Also, the mobile station apparatus makes transmission channel estimates of resource elements in which no pilots are mapped, based on the result of the estimates of the resource elements with pilots mapped. To make estimates of the resource elements with no pilots mapped, the mobile station apparatus carries out, for example, interpolation in the time (i.e. symbol) direction and the frequency (i.e. subcarrier) direction using the result of the estimates of the resource elements with pilots mapped.

Next is described the case of performing transmission channel estimation by interpolation.

When a sampling function is used, an allowable delay spread Td is determined by a pilot spacing Nf (Nf is an integer larger than 0) in the frequency direction. Also, an allowable Doppler frequency fd is determined by a pilot spacing Nt in the time direction. The term "allowable" here refers to being able to perform interpolation. The relationships between the allowable delay spread Td and the allowable Doppler frequency fd are expressed by the following relational expressions (1) and (2).

$$Td < 1/(Nf \cdot f0) \quad (1)$$

$$fd < 1/(2Nt \cdot Ts) \quad (2)$$

In the relational expressions (1) and (2) f0 is a subcarrier frequency spacing, and Ts is a symbol length of OFDM.

According to the relational expressions (1) and (2), if the delay spread Td is large or the Doppler frequency fd is high, the relational expressions (1) and (2) can be satisfied by arranging pilots close to one another to be thus densely spaced. For example, as illustrated in FIG. 2, the pilot spacings in both the frequency direction and the time direction are made smaller compared to the case of FIG. 1.

The pilot spacings can be set larger, for example, if transmission channel characteristics are favorable compared to the case where they are poor. The pilot spacings may be dynamically changed between the mobile station apparatus and a base station apparatus in communication with the mobile station apparatus.

Such a mobile station apparatus is described below with reference to FIG. 3.

Downlink signals are transmitted from a base station apparatus. In the downlink signals, pilots are mapped, as illustrated in FIG. 1. In the example of FIG. 1, pilots are spaced every 6 resource elements apart in the frequency direction and every 4 resource elements apart in the time direction.

In a mobile station apparatus 1, a downlink signal is received by a radio reception unit 2. The received downlink signal is input to an FFT (fast Fourier transform) unit 4. The FFT unit 4 performs a fast Fourier transformation on the input downlink signal. The downlink signal after the fast Fourier transformation is input to a speed measurement unit 12, a transmission channel estimation unit 6 and a compensation unit 8. The transmission channel estimation unit 6 performs transmission channel estimation using pilots included in the fast Fourier transformed downlink signal, and then inputs the estimation result to the compensation unit 8. The compensation unit 8 makes compensation to the fast Fourier transformed downlink signal based on the estimation result input from the transmission channel estimation unit 6.

The arrangement of the pilots included in the downlink signal is already known to the mobile station apparatus 1. For example, it may be arranged at the time when the base station apparatus and the mobile station apparatus 1 initiate communications such that the arrangement of pilots included in a first downlink signal transmitted from the base station apparatus is the same as the arrangement of pilots included in a first downlink signal received by the mobile station apparatus 1. As a result, when communications are established between the base station apparatus and the mobile station apparatus 1, the arrangement of the pilots included in the downlink signal is known to both the base station apparatus and the mobile station apparatus 1. The downlink signal compensated based on the result of the transmission channel estimation is input to a decode unit 10. The decode unit 10 decodes the input downlink signal. The decoded data are used as received data.

On the other hand, the speed measurement unit 12 measures the speed of the mobile station apparatus 1 based on the fast Fourier transformed downlink signal. The measured speed information is input to a pilot arrangement determination unit 14. The pilot arrangement determination unit 14 makes a determination on the arrangement of pilots based on the input speed information. For example, if the speed is fast, the pilot arrangement determination unit 14 may determine the necessity to space the pilots more densely. As has been explained with reference to FIG. 2, the pilot arrangement determination unit 14 may determine to, for example, space the pilots every 3 resource elements apart in the frequency direction and every 2 resource elements apart in the time direction. The pilot arrangement determination unit 14 inputs the determined pilot arrangement to the transmission channel estimation unit 6 and the compensation unit 8. The pilot arrangement determination unit 14 also inputs information indicating the determined pilot arrangement to a control channel encode unit 16. The control channel encode unit 16 encodes the input information as control information, and inputs the control information to a multiplexing unit 18. The multiplexing unit 18 multiplexes, with an uplink data channel, the input control information as an uplink control channel. The multiplexing unit 18 then inputs, to a modulation unit 20, an uplink signal into which the uplink control channel and the uplink data channel are multiplexed. The modulation unit 20 performs a modulation process on the uplink signal. The modulation unit 20 inputs the modulated uplink signal to a radio transmission unit 22. The radio transmission unit 22 transmits the input uplink signal to the base station apparatus.

The base station apparatus arranges pilots in a downlink signal in accordance with the pilot arrangement carried by the uplink control channel. Then, the base station apparatus transmits the downlink signal.

The mobile station apparatus 1 receives the downlink signal at the radio reception unit 2. Then, the FFT unit 4 performs a fast Fourier transformation on the downlink signal. The transmission channel estimation unit 6 performs transmission channel estimation based on the pilot arrangement input from the pilot arrangement determination unit 14. The compensation unit 8 makes compensation to the fast Fourier transformed downlink signal based on the estimation result obtained by the transmission channel estimation unit 6. The compensated downlink signal is input to the decode unit 10, which then decodes the input downlink signal. The decoded data are used as received data.

The transmission channel estimation unit 6 and the compensation unit 8 (part indicated by a dashed line in FIG. 3) are described below with reference to FIG. 4.

Assume that an FFT output of an OFDM receiver is obtained by the following expression (3).

$$X(k,l) = H(k,l)d(k,l) + Z(k,l) \quad (3)$$

$H(k,l)$ is a transmission channel characteristic corresponding to a first carrier wave (subcarrier) of an OFDM symbol at a time k. Assume that $d(k,l)$, which is a transmission symbol, is known to the OFDM receiver. $Z(k,l)$ is an additive noise. A transmission channel estimate $H'(k,l)$ is obtained by the following expression (4).

$$\begin{aligned} H'(k, l) &= X(k, l)/d(k, l) \\ &= H(k, l) + Z(k, l)/d(K, l) \end{aligned} \quad (4)$$

$d(k,l)$ is an example of pilots generated by a pilot generation unit 24 in FIG. 4. A complex division unit 28 calculates the expression (4).

The pilot generation unit 24 generates pilots, and inputs the generated pilots to the complex division unit 28. A pilot pattern selection unit 26 selects pilots from fast Fourier transformed symbols input from the FFT unit 4, and inputs the pilots to the complex division unit 28. The complex division unit 28 obtains transmission channel characteristics corresponding to the pilots input from the pilot pattern selection unit 26 based on the pilots input from the pilot generation unit 24, and inputs the obtained transmission channel characteristics of the pilots to a time-direction interpolation unit 30. The time-direction interpolation unit 30 performs interpolation in the time direction. The time-direction interpolation unit 30 inputs, to a frequency-direction interpolation unit 32, transmission channel characteristics corresponding to the pilots based on which the time-direction interpolation has been performed. The frequency-direction interpolation unit 32 performs interpolation in the frequency direction. The frequency-direction interpolation unit 32 inputs, to a complex division unit 34, transmission channel estimation results obtained after the frequency-direction interpolation. Based on the transmission channel estimation results, the complex division unit 34 estimates transmitted symbols, which are then input to the decode unit 10.

A scheme referred to as the scattered pilot (SP) scheme is one way to insert pilots. One example of a scattered pilot arrangement is explained with reference to FIG. 5.

In the case where the scattered pilot scheme is applied, the tolerance of the delay spread can be increased by, for example, performing the time-direction interpolation first, and then performing the frequency-direction interpolation using the result of the time-direction interpolation. In the case of FIG. 5, if the time-direction interpolation is performed first, the resource element spacing Nf, with which transmission channel characteristics in the frequency direction are obtained, can be changed from 9 to 3, and therefore, the tolerance of the delay spread becomes three times larger.

Japanese Laid-open Patent Application Publication No. 2007-150971

In the case where pilots are spaced densely, as described above, resource elements allocated to data decrease, which in turn results in a decrease in the throughput. Given this factor, the scattered pilot scheme is applied to thereby increase the tolerance of the delay spread without increasing the number of pilots.

In this case, however, although the tolerance of the delay spread can be increased, the tolerance of the Doppler frequency is reduced.

SUMMARY

According to an aspect of the present disclosures, a mobile station apparatus, which receives a downlink signal including pilots, includes a first estimation unit configured to estimate a delay spread of a transmission channel and a Doppler frequency based on the downlink signal; a determination unit configured to determine, based on the delay spread and the Doppler frequency, an interpolation method to be applied to the pilots; and a second estimation unit configured to perform interpolation using the interpolation method to estimate the transmission channel.

According to another aspect of the present disclosures, a transmission channel estimation method includes the steps of estimating a delay spread of a transmission channel and a Doppler frequency based on a downlink signal; determining, based on the delay spread and the Doppler frequency, an interpolation method to be performed on pilots included in the downlink signal; and performing interpolation by the interpolation method to estimate the transmission channel.

Additional objects and advantages of the embodiment will be set forth in part in the description which follows, and in part will be obvious from the description, or may be learned by practice of the present disclosures. The object and advantages of the present disclosures will be realized and attained by means of the elements and combinations particularly pointed out in the appended claims.

It is to be understood that both the foregoing general description and the following detailed description are exemplary and explanatory only and are not restrictive of the present disclosures as claimed.

DESCRIPTION OF EMBODIMENT

Figure 1:
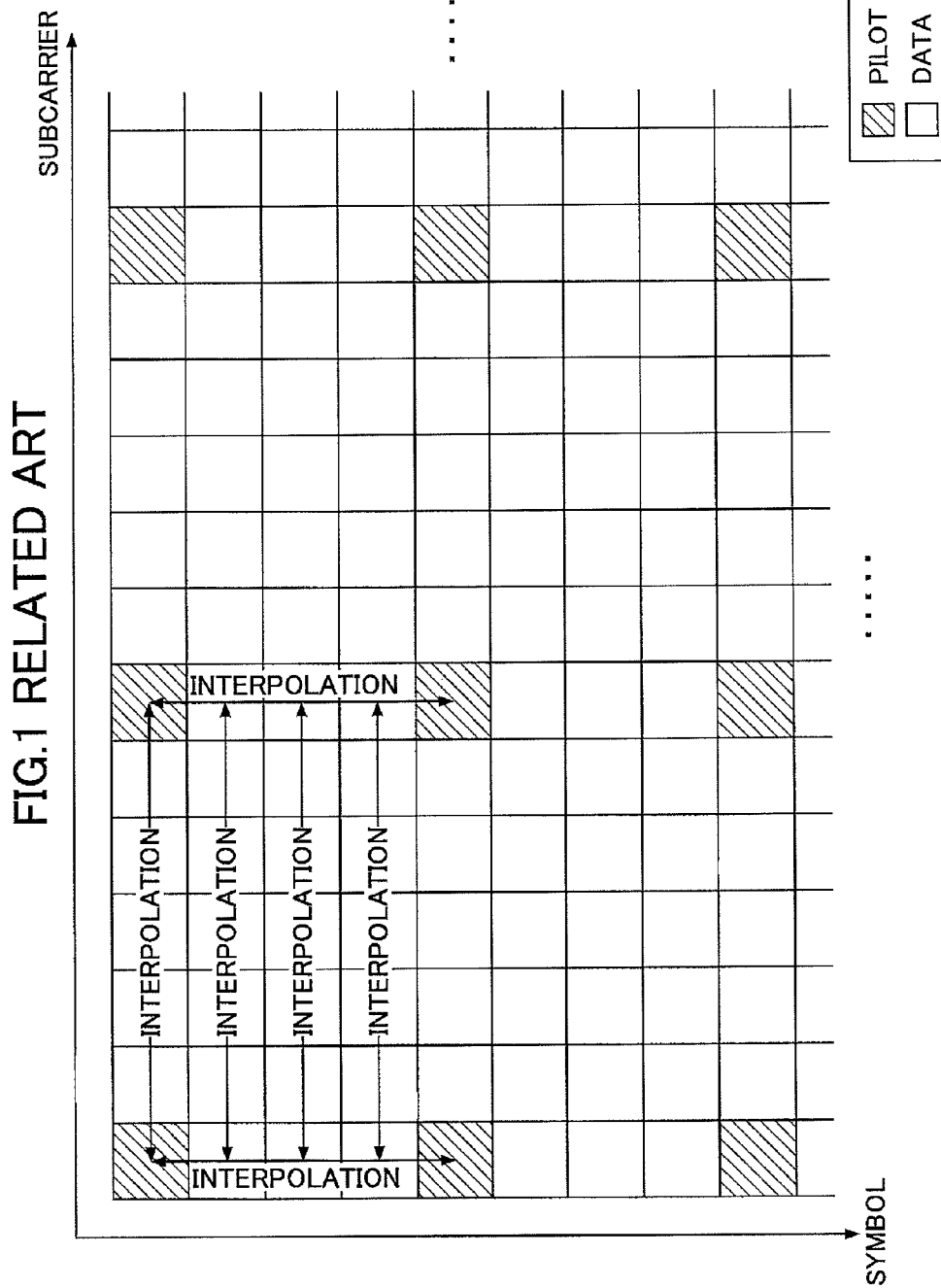
FIG. 1 shows an example of a pilot arrangement.
Figure 2:
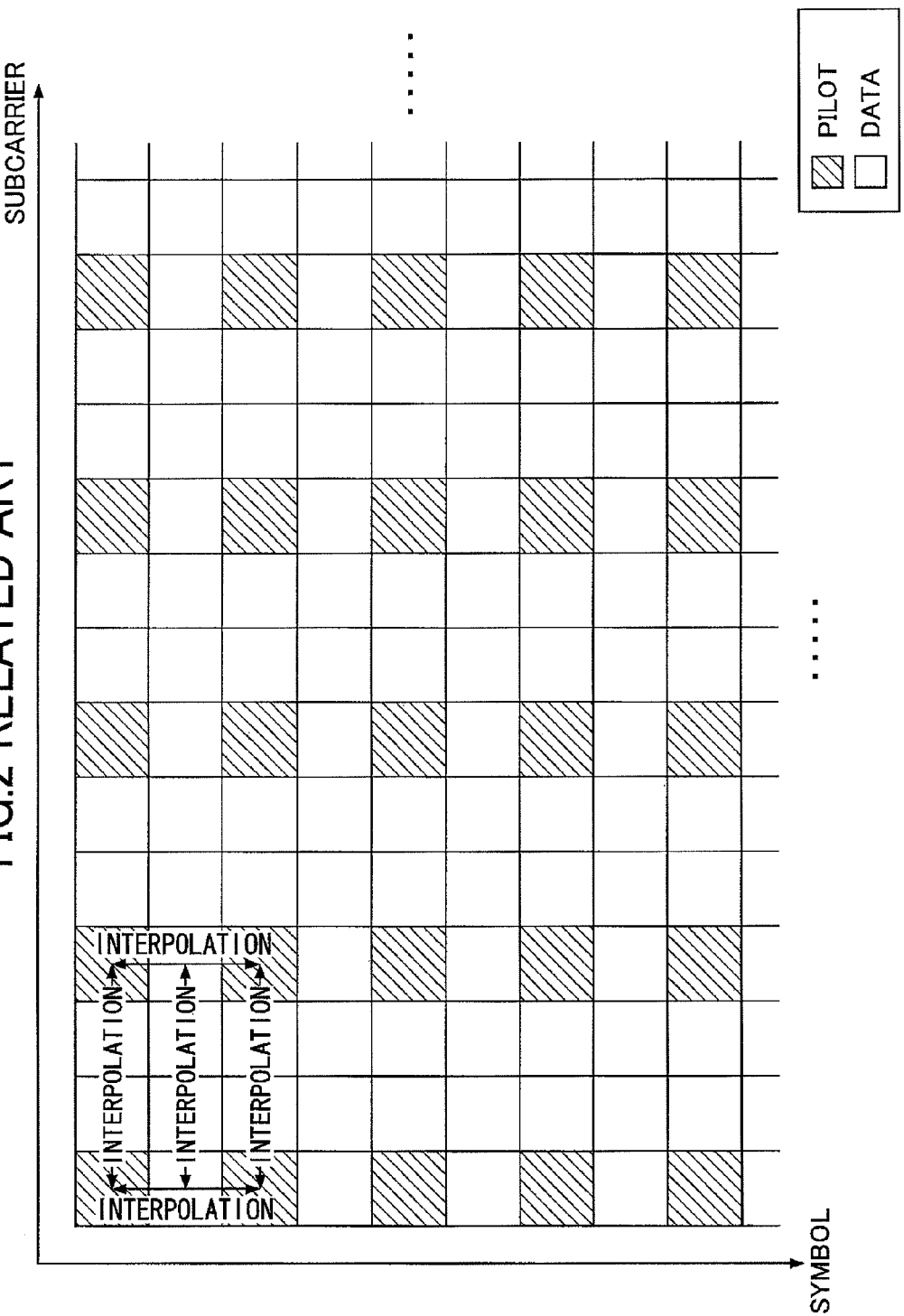
FIG. 2 shows another example of the pilot arrangement.
Figure 3:
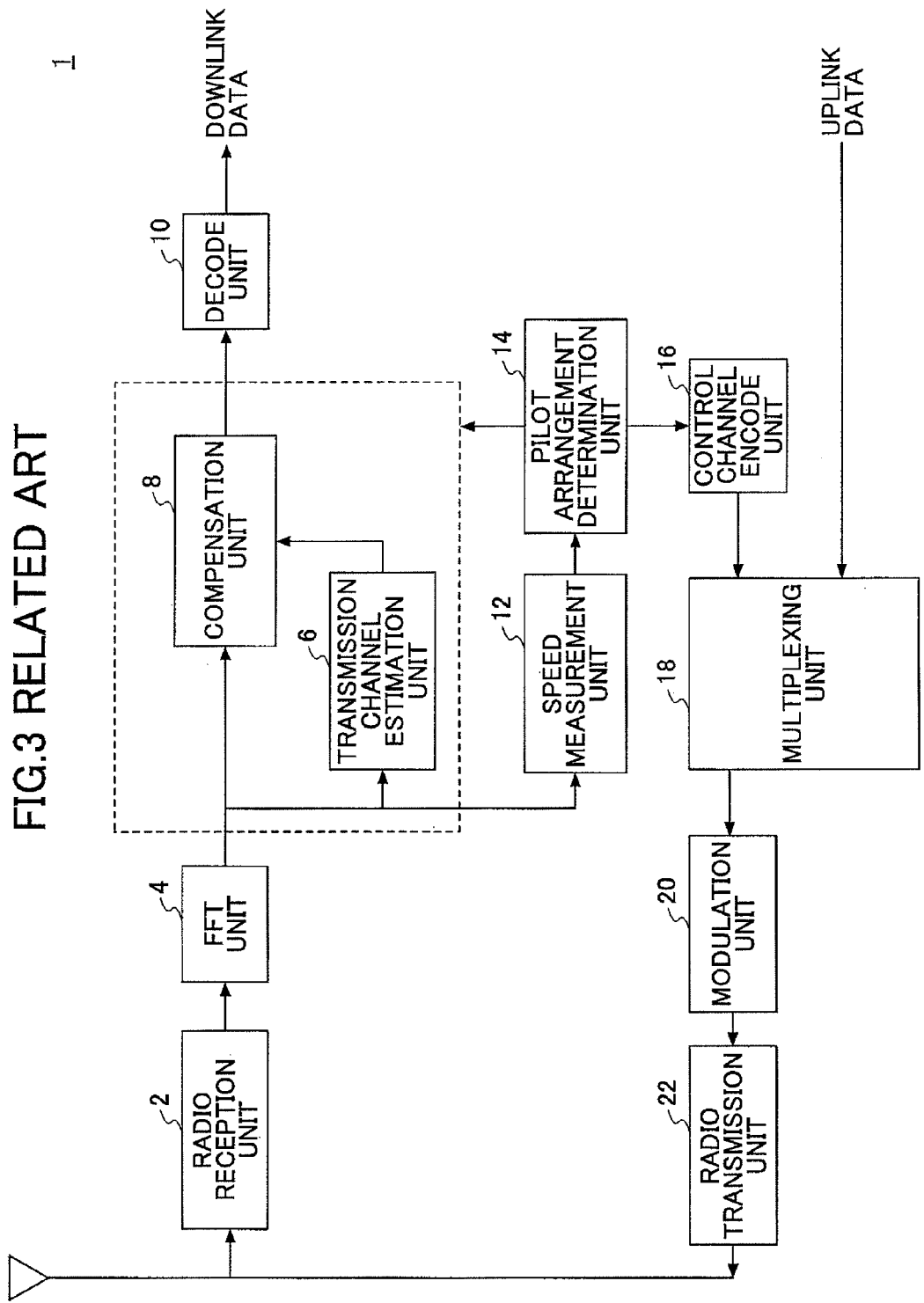
FIG. 3 is a partial block diagram of a mobile station apparatus.
Figure 4:
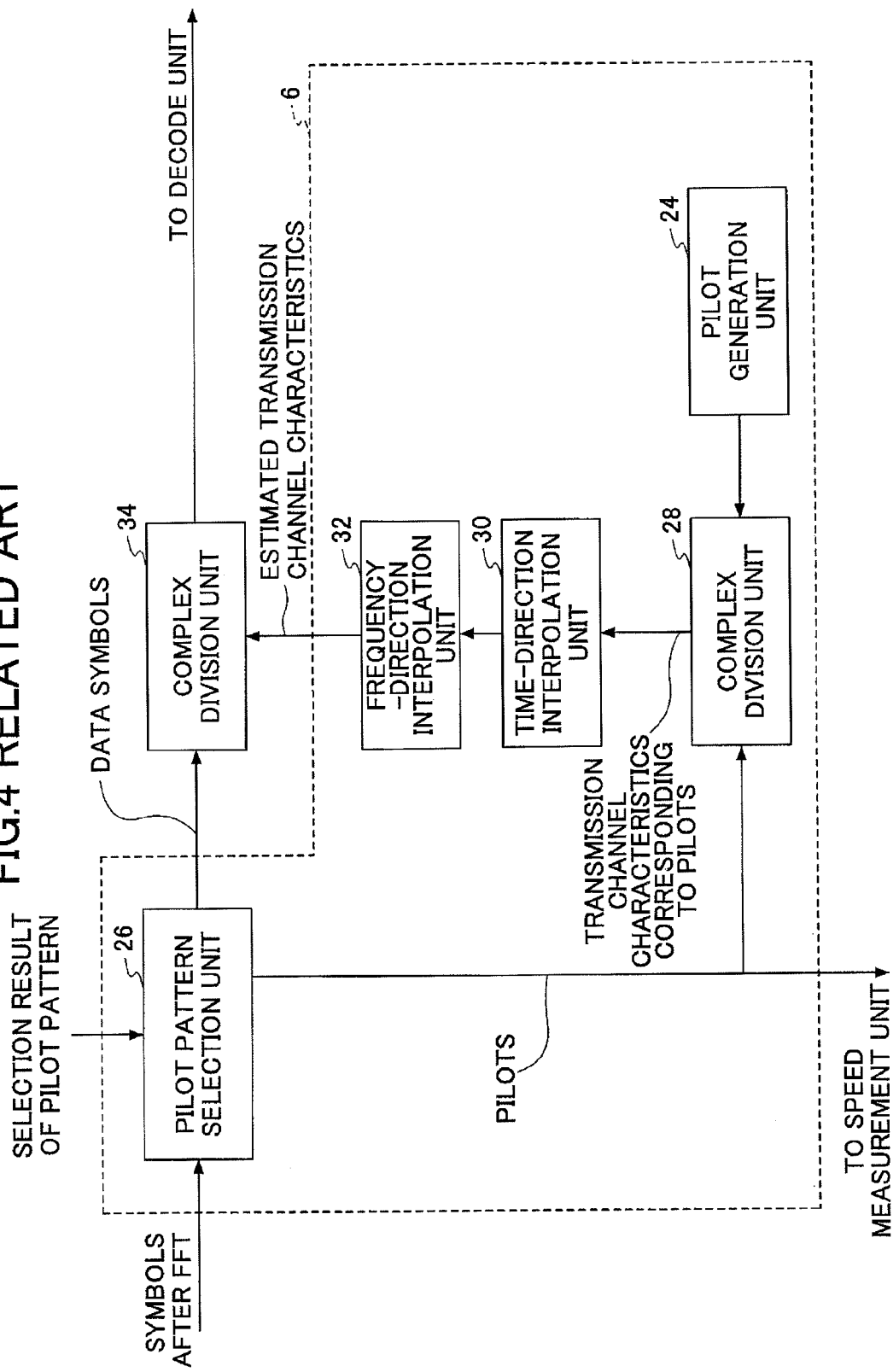
FIG. 4 is a partial block diagram of the mobile station apparatus.

Embodiments that describe the best mode for carrying out the present disclosures are explained next with reference to the drawings.

In all drawings used to describe the embodiments, the same reference numerals are given to components having the same functions, and their explanations are omitted.

(a) First Embodiment

An example of a mobile communications system of one embodiment of the present disclosures, which includes a base station apparatus and a mobile station apparatus, is explained below with reference to FIG. 6.

Multicarrier transmission is used in the mobile communications system of the present embodiment. This mobile communications system transmits user data using shared channels. Alternatively, the mobile communications system may transmit user data using common channels. In the mobile communications system, the base station apparatus transmits a downlink signal including symbols for transmission channel estimation, based on which the mobile station apparatus performs transmission channel estimation. These symbols may be referred to as pilots, or reference signals. One example of mobile communications systems having such characteristics is a LTE (Long Term Evolution) mobile communications system. In the present embodiment, a LTE mobile communications system is described by way of example; however, the present embodiment may be applied to mobile communications systems other than those supporting LTE, provided that the mobile communications systems have the above-mentioned characteristics. For example, the present embodiment may be applied to WiMAX (Worldwide Interoperability for Microwave Access) WLAN (Wireless LAN) mobile communications systems, or digital TV broadcasting. A LTE mobile communications system may also referred to as "Evolved UTRA and UTRAN".

Figure 6:
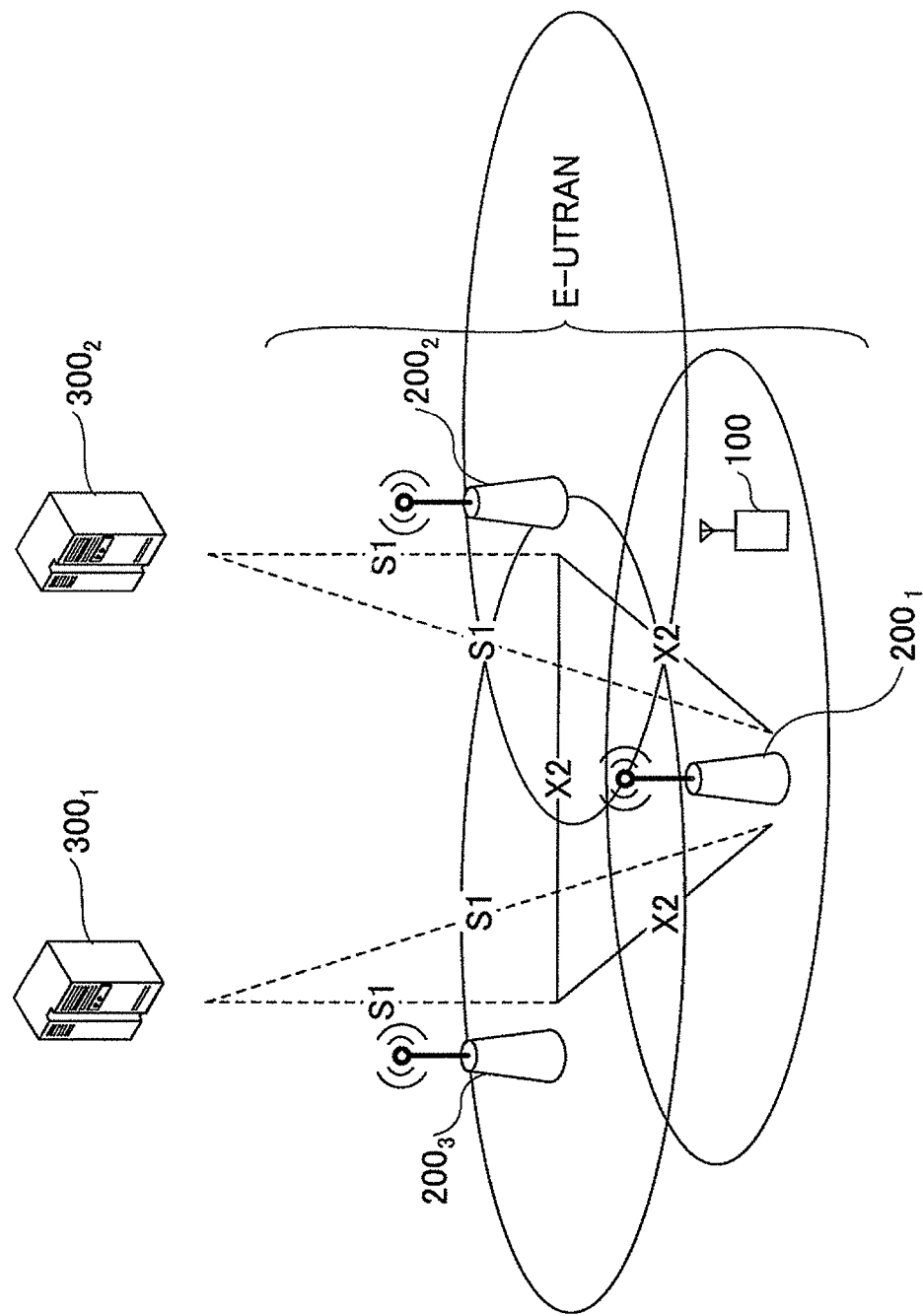
FIG. 6 shows a mobile communications system according to an embodiment.

The mobile communications system according to the present embodiment includes one or more mobile station apparatuses (User Equipment, UE) 100 and one or more base station apparatuses (eNode B, eNB) 200 ($200_1$, $200_2$ and $200_3$ in FIG. 6). Note that where differentiation is not required, the "mobile station apparatus 100" and "base station apparatus 200" are used for one or more of the mobile station apparatuses and one or more of the base station apparatuses, respectively. The mobile communications system also includes MME/S-GWs (Mobility Management Entities/Serving-Gateway) 300 ($300_1$ and $300_2$ in FIG. 6) superordinate to the base station apparatuses 200.

In FIG. 6, reference numeral S1 represents an interface between a base station apparatus 100 and a MME/S-GW 300, and a reference numeral X2 is an interface between base station apparatuses 200.

The base station apparatuses 200 perform call-control operations and wireless-control operations. The base station apparatuses 200 also have a RRC (Radio Resource Control) function. The base station apparatuses 200 include S1-AP (Application) and X2-AP.

The MME/S-GWs 300 terminate NAS (Non-Access Stratum) signaling security, and manages mobile station apparatuses in the idle mode and SAE (System Architecture Evolution) bearer resources.

The mobile communications system uses, as wireless access schemes, Orthogonal Frequency Division Multiple Access (OFDMA) for the downlink and Single-Carrier Frequency Division Multiple Access (SC-FDMA) for the uplink. OFDMA is a scheme in which a frequency range is divided into multiple narrow frequency bands (sub-carriers) and data are transmitted in each frequency band. SC-FDMA is a transmission scheme capable of reducing interference between terminals by dividing a frequency range and having multiple terminals transmit in different frequency bands.

In the mobile communications system according to the present embodiment, the scattered pilot scheme is applied as a way to insert pilots. According to the scattered pilot scheme, pilots are assigned to subcarriers in such a manner that pilot-assigned subcarriers in one symbol are different from pilot-assigned subcarriers in the immediately preceding symbol, as described below with reference to FIG. 5.

In the mobile communications system according to the present embodiment, the mobile station apparatus 100 determines the processing order of the time-direction interpolation process and the frequency-direction interpolation process based on the tolerance of the delay spread and/or the tolerance of the Doppler frequency. In other words, the mobile station apparatus 100 of the present embodiment dynamically selects the processing order of the time-direction interpolation process and the frequency-direction interpolation process. If the tolerances of the delay spread and the Doppler frequency are not satisfied even when the two interpolation processes are applied according to the determined processing order, the mobile station apparatus 100 may determine to change the pilot arrangement and reports the arrangement change to the base station apparatus 200. In this case, for example, the mobile station apparatus 100 increases the number of pilots. Thus, by changing the pilot arrangement, it is possible to arrange the pilots efficiently. Also, with the application of the scattered pilot scheme, more symbols and subcarriers can be allocated to data, whereby the throughput can be improved.

Figure 7:
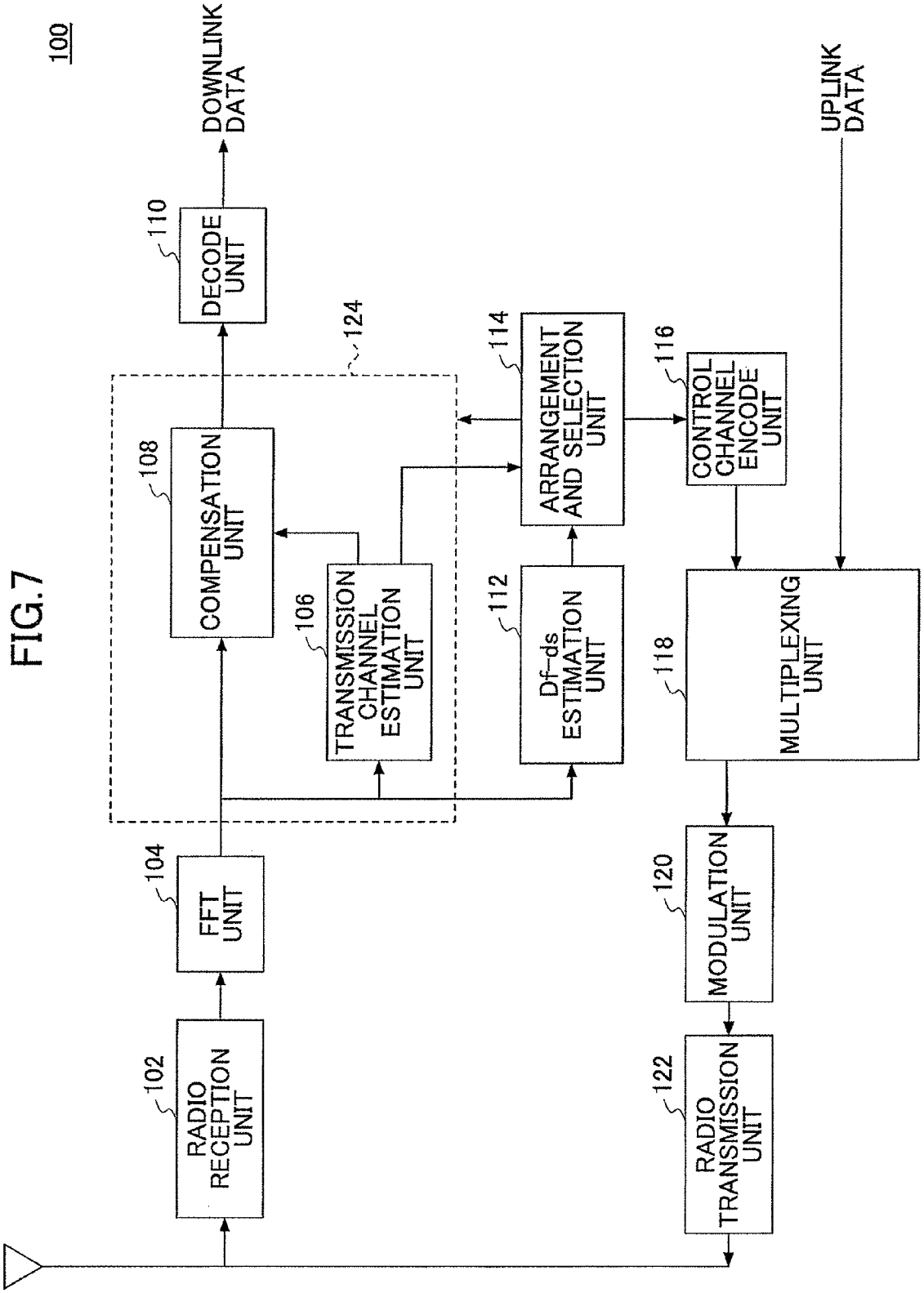
FIG. 7 is a partial block diagram of a mobile station apparatus of an embodiment.

The mobile station apparatus 100 is described below with reference to FIG. 7.

The mobile station apparatus 100 includes a radio reception unit 102. The radio reception unit 102 receives a downlink signal transmitted by the base station apparatus 200. The radio reception unit 102 inputs the received downlink signal to an FFT unit 104 to be described below.

The mobile station apparatus 100 includes the FFT unit 104. The FFT unit 104 performs a fast Fourier transformation on the downlink signal input from the radio reception unit 102. The FFT unit 104 inputs the fast Fourier transformed downlink signal to a transmission channel estimation unit 106, a compensation unit 108 and a Doppler frequency-delay spread (Df-ds) estimation unit 112 to be described below.

The mobile station apparatus 100 includes the transmission channel estimation unit 106. The transmission channel estimation unit 106 performs transmission channel estimation using pilots included in the fast Fourier transformed downlink signal, and then inputs the estimation result to the compensation unit 108. The transmission channel estimation unit 106 also inputs information indicating the pilot arrangement to a pilot arrangement and interpolation method selection unit (hereinafter, referred to simply as "arrangement and selection unit") 114.

The mobile station apparatus 100 includes the compensation unit 108. The compensation unit 108 makes compensation to the fast Fourier transformed downlink signal based on the estimation result input from the transmission channel estimation unit 106. The compensation unit 108 inputs the compensated downlink signal to a decode unit 110 to be described below.

The mobile station apparatus 100 includes the decode unit 110. The decode unit 110 decodes the input downlink signal. The decoded data are used as received data.

The mobile station apparatus 100 includes the Df-ds estimation unit 112. The Df-ds estimation unit 112 estimates the Doppler frequency and the transmission channel based on the fast Fourier transformed downlink signal. Then, the Df-ds estimation unit 112 inputs the estimated Doppler frequency and delay spread of the transmission channel to the arrangement and selection unit 114.

The mobile station apparatus 100 includes the arrangement and selection unit 114. Based on the Doppler frequency and delay spread input from the Df-ds estimation unit 112 and the information (indicating the pilot arrangement) input from the transmission channel estimation unit 106, the arrangement and selection unit 114 determines whether the resource element spacing Nf, with which transmission channel characteristics in the frequency direction are obtained when interpolation is performed, and the resource element spacing Nt, with which transmission channel characteristics in the time direction are obtained when interpolation is performed, satisfy relationships that should be satisfied when interpolation is performed. Note that a resource element here is defined as a radio resource indicated by one subcarrier and one symbol, as described above.

The relationships that should be satisfied when interpolation is performed are expressed by the following expressions (5) and (6).

$$Nf < 1/(Td \cdot f0) \quad (5)$$

$$Nt < 1/(2fd \cdot Ts) \quad (6)$$

In the relational expressions (5) and (6) f0 is a subcarrier frequency spacing, and Ts is a symbol length of OFDM.

In the above determination made by the arrangement and selection unit 114, the resource element spacing Nf is specifically a frequency-direction spacing with which transmission channel characteristics in the frequency direction can be obtained when a predetermined interpolation method is performed based on the information (indicating the pilot arrangement) input from the transmission channel estimation unit 106. Also, the resource element spacing Nt is specifically a time-direction spacing with which transmission channel characteristics in the time direction can be obtained when the predetermined interpolation method is performed. If determining that the resource element spacings Nf and Nt satisfy the relational expressions (5) and (6), the arrangement and selection unit 114 determines to use the predetermined interpolation method as originally intended. The interpolation method includes, for example, a method of performing interpolation first in the time direction and then performing interpolation in the frequency direction using the result of the time-direction interpolation (hereinafter, referred to as "interpolation method 1"), and a method of performing interpolation first in the frequency direction and then performing interpolation in the time direction using the result of the frequency-direction interpolation ("interpolation method 2"). The present embodiment describes the case in which the interpolation method 1 is applied as the predetermined interpolation method; however, the following procedure is the same if the interpolation method 2 is adopted as the predetermined interpolation method.

In the case where the interpolation method 1 is adopted, the arrangement and selection unit 114 determines whether the resource element spacing Nf and/or Nt still satisfy the relational expressions (5) and (6) even if the frequency-direction spacing in which pilots are mapped and/or the time-direction spacing of resource elements in which pilots are mapped is made greater. When determining affirmatively, the arrangement and selection unit 114 determines to increase the frequency-direction spacing and/or the time-direction spacing of resource elements in which pilots are mapped.

Figure 5:
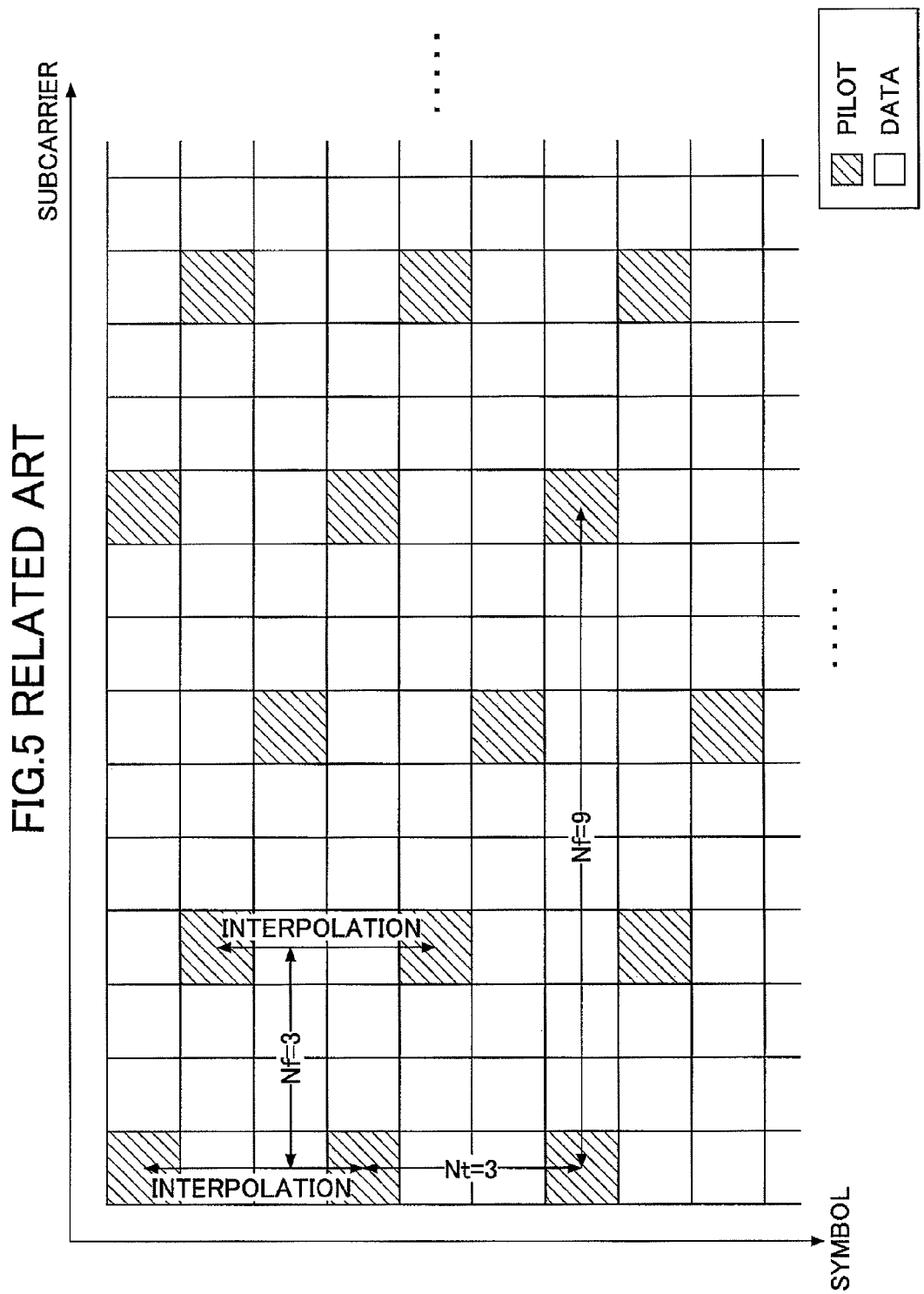
FIG. 5 shows another example of the pilot arrangement.

For example, consider the case in which a downlink signal as illustrated in FIG. 5 is received. In FIG. 5, pilots are spaced every 9 resource elements apart in the frequency direction and every 3 resource elements apart in the time direction. In this case, by applying the interpolation method 1, interpolation is performed first in the time direction, and then performed in the frequency direction using the result of the time-direction interpolation. Accordingly, the resource element spacing Nf becomes 3 while the resource element spacing Nt in the time direction becomes 3.

Figure 8:
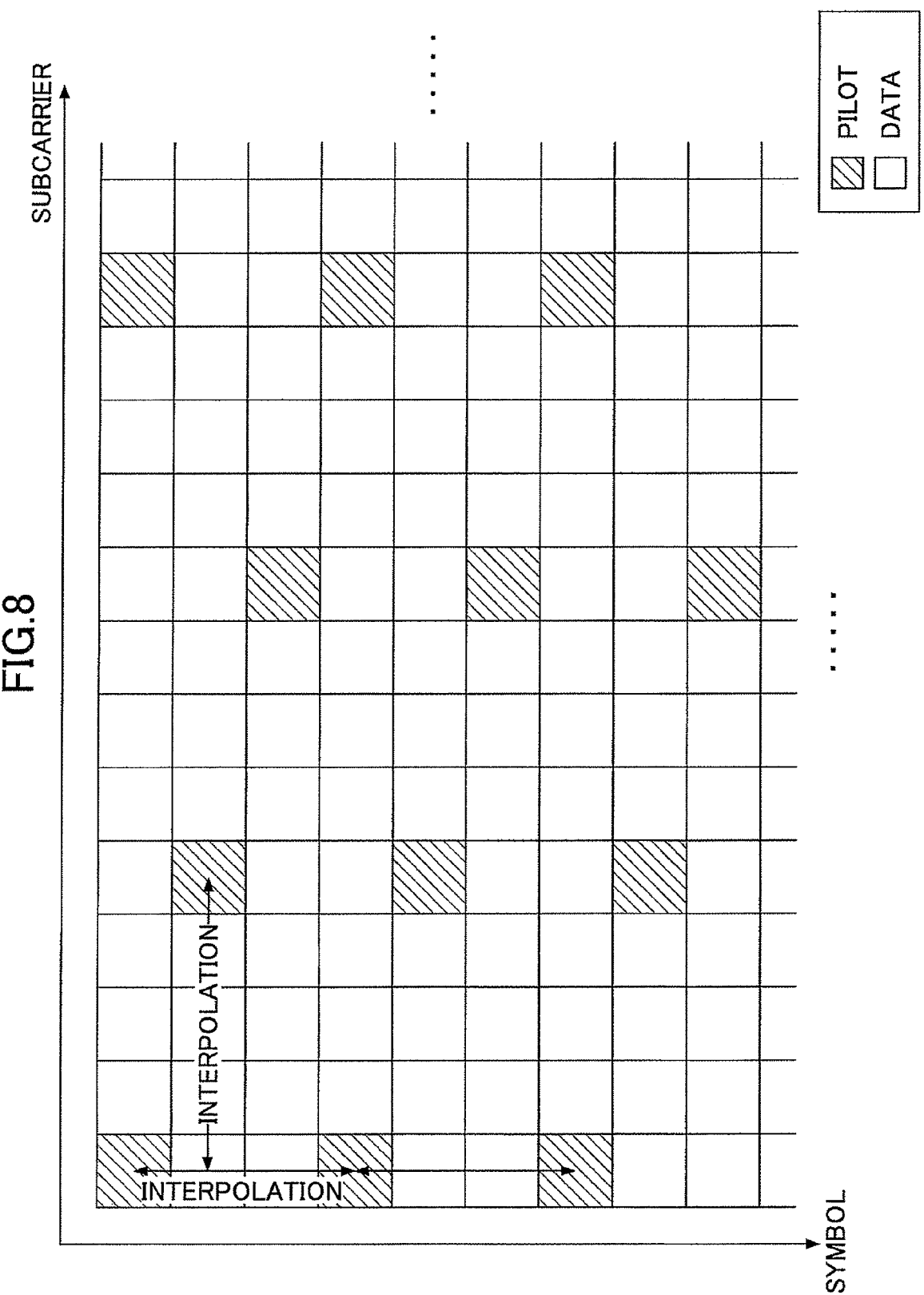
FIG. 8 is an example of a pilot arrangement according to an embodiment.

The arrangement and selection unit 114 also determines whether the pilots can be more sparsely spaced in the frequency direction and/or the time direction. For example, the arrangement and selection unit 114 may determine whether the pilots can be shifted in the frequency direction in such a manner to increase the resource element spacing Nf by one subcarrier. If the pilots are shifted in such a manner, the pilots are spaced every 12 resource elements apart in the frequency direction and every 3 resource element apart in the time direction, as illustrated in FIG. 8. In this case, by adopting the interpolation method 1, the resource element spacing Nf in the frequency direction becomes 4 while the resource element spacing Nt in the time direction becomes 3. At this point, if the resource element spacings Nf and Nt still satisfy the relational expressions (5) and (6), the arrangement and selection unit 114 determines to space the pilots more sparsely in such a manner. On the other hand, if the resource element spacings Nf and Nt of the interpolation method 1 or 2 do not satisfy the above relational expressions (5) and (6), which are calculated based on the Doppler frequency and the delay spread of the transmission channel, the arrangement and selection unit 114 spaces the pilots more densely in the frequency direction and/or the time direction. Note however that, depending on a Doppler frequency and a delay spread of the transmission channel obtained after the pilots have been once densely spaced, even if the pilots are again spaced more sparsely, the resource element spacings Nf and Nt of the interpolation method 1 or 2 may satisfy the relational expressions (5) and (6). In such a case, the pilots are again spaced more sparsely in the frequency direction and/or the time direction. In other words, the pilot arrangement is put back to the original one. As a result, more resource elements can be allocated to data. In addition, according to the Doppler frequency and/or the delay spread of the transmission channel, the amount of pilots to be shifted in the frequency direction and/or the time direction may be changed. For example, pilots may be shifted in such a manner to increase the resource element spacing Nf by two subcarriers or more and/or increase the resource element spacing Nt by two symbols or more.

When determining that the resource element spacings Nf and Nt of the predetermined interpolation method, i.e. the interpolation method 1, satisfy only the relational expression (5), the arrangement and selection unit 114 determines to adopt the interpolation method 2. According to the interpolation method 2, interpolation is performed first in the frequency direction, and then performed in the time direction based on the result of the frequency-direction interpolation.

Figure 9:
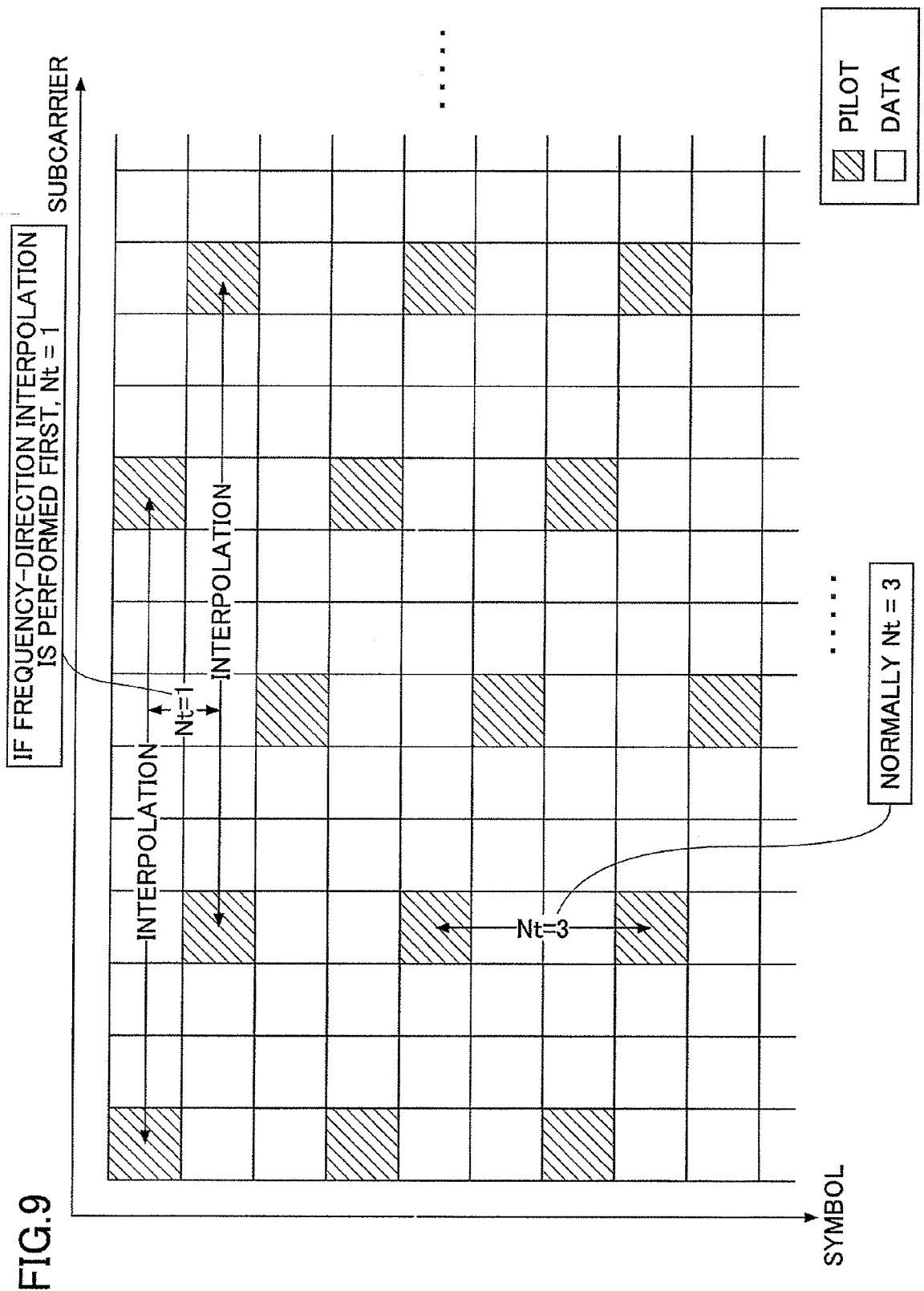
FIG. 9 is another example of the pilot arrangement according to an embodiment.

Then, the arrangement and selection unit 114 obtains the resource element spacings Nf and Nt of the interpolation method 2. The arrangement and selection unit 114 subsequently determines whether the obtained resource element spacings Nf and Nt satisfy the relational expressions (5) and (6). If the obtained resource element spacings Nf and Nt satisfy the relational expressions (5) and (6), the arrangement and selection unit 114 adopts the interpolation method 2. For example, consider the case in which a downlink signal as illustrated in FIG. 5 is received. In FIG. 5, the resource element spacings Nf and Nt of the interpolation method 1 are 3 and 3, respectively. On the other hand, the resource element spacings Nf and Nt of the interpolation method 2 are 9 and 1, respectively, as illustrated in FIG. 9. If determining that Nt=1 and Nf=9 satisfy the relational expressions (5) and (6), the arrangement and selection unit 114 determines to adopt the interpolation method 2. Note however that the resource element spacing Nf increases due to the interpolation method being adopted, and as a result, the resource element spacings Nf and Nt may not satisfy the relational expression (5). In this case, the arrangement and selection unit 114 may determine to space the pilots more densely.

Figure 10:
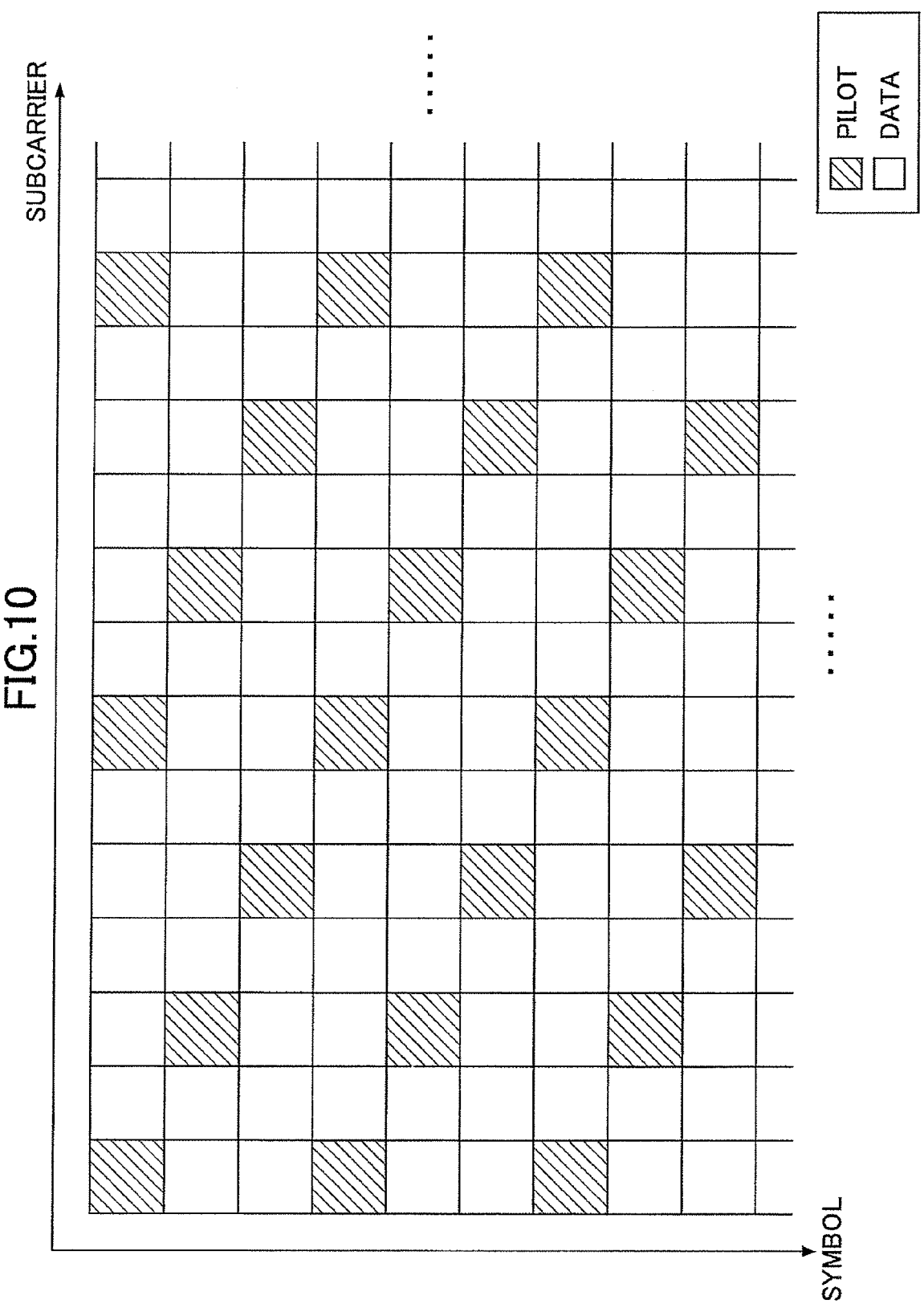
FIG. 10 is another example of the pilot arrangement according to an embodiment.

For example, the arrangement and selection unit 114 determines whether the pilots can be spaced more densely in the frequency direction and/or the time direction—for example, whether the pilots can be shifted in the frequency direction in such a manner to decrease the resource element spacing Nf by one subcarrier. If the pilots are shifted in such a manner, the pilots are spaced every 6 resource elements apart in the frequency direction and every 3 resource elements apart in the time direction, as illustrated in FIG. 10. If the resource element spacings Nf and Nt after the pilots are shifted satisfy the relational expressions (5) and (6), the arrangement and selection unit 114 determines to space the pilots more densely in such a manner.

Then, the arrangement and selection unit 114 inputs information indicating the determined interpolation method to the transmission channel estimation unit 106. The arrangement and selection unit 114 also inputs the determined pilot arrangement to the transmission channel estimation unit 106. The arrangement and selection unit 114 also inputs the determined pilot arrangement to a control channel encode unit 116.

The mobile station apparatus 100 includes the control channel encode unit 116. The control channel encode unit 116 encodes the input information indicating the pilot arrangement as control information. The control channel encode unit 116 then inputs the control information to a multiplexing unit 118 to be described below.

The mobile station apparatus 100 includes the multiplexing unit 118. The multiplexing unit 118 multiplexes, with an uplink data channel, the input control information as an uplink control channel. The multiplexing unit 118 then inputs, to a modulation unit 120 to be described below, an uplink signal into which the uplink control channel and the uplink data channel are multiplexed.

The mobile station apparatus 100 includes the modulation unit 120. The modulation unit 120 performs a modulation process on the uplink signal. The modulation unit 120 inputs the modulated uplink signal to a radio transmission unit 122 to be described below.

The mobile station apparatus 100 includes the radio transmission unit 122. The radio transmission unit 122 transmits the input uplink signal to the base station apparatus 200.

Figure 11:
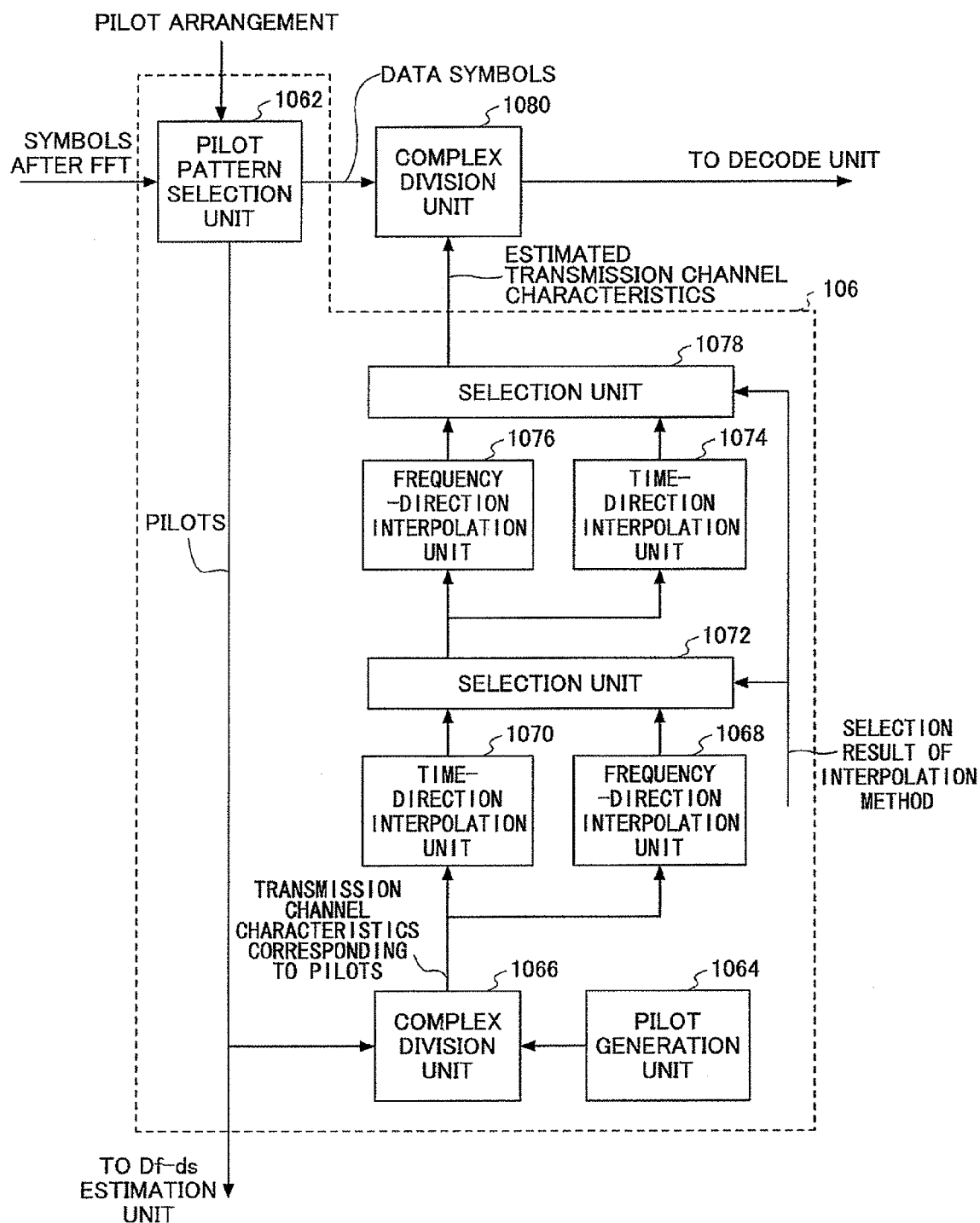
FIG. 11 is a partial block diagram of the mobile station apparatus according to an embodiment.

The transmission channel estimation unit 106 and the compensation unit 108 (dashed-line part indicated by a reference numeral 124 in FIG. 7) are described below with reference to FIG. 11.

Assume that an FFT output of an OFDM receiver is obtained by the above expression (3). In this case, the transmission channel estimate H'(k,1) is obtained by the above expression (4).

The transmission channel estimation unit 106 of the present embodiment includes a pilot pattern selection unit 1062, to which the information indicating the pilot arrangement is input from the arrangement and selection unit 114. Based on the input pilot arrangement, the pilot pattern selection unit 1062 selects pilots included in the fast Fourier transformed downlink signal input from the FFT unit 104. The pilot pattern selection unit 1062 inputs the selected pilots to the Df-ds estimation unit 112 and a complex division unit 1066 to be described below. The pilot pattern selection unit 1062 inputs, to a complex division unit 1080 to be described below, data symbols included in the fast Fourier transformed downlink signal input from the FFT unit 104.

The transmission channel estimation unit 106 includes a pilot generation unit 1064. The pilot generation unit 1064 generates pilots, such as d(k,1), and inputs the generated pilots to the complex division unit 1066.

The transmission channel estimation unit 106 includes the complex division unit 1066. Based on the pilots input from the pilot generation unit 1064, the complex division unit 1066 estimates transmission channel characteristics corresponding to the pilots input from the pilot pattern selection unit 1062, and then inputs the estimated transmission channel characteristics to a frequency-direction interpolation unit 1068 and a time-direction interpolation unit 1070 to be described below.

The transmission channel estimation unit 106 includes the frequency-direction interpolation unit 1068. The frequency-direction interpolation unit 1068 performs interpolation in the frequency direction on the transmission channel characteristics corresponding to the pilots, which are input from the complex division unit 1066, and then inputs the frequency-direction interpolation result to a selection unit 1072.

The transmission channel estimation unit 106 includes a time-direction interpolation unit 1070. The time-direction interpolation unit 1070 performs interpolation in the time direction on the transmission channel characteristics corresponding to the pilots, which are input from the complex division unit 1066, and then inputs the time-direction interpolation result to the selection unit 1072.

The transmission channel estimation unit 106 includes the selection unit 1072. Based on an interpolation method input from the arrangement and selection unit 114, the selection unit 1072 selects either one of the frequency-direction interpolation result input from the frequency-direction interpolation unit 1068 and the time-direction interpolation result input from the time-direction interpolation unit 1070. In the case of selecting the frequency-direction interpolation result, the selection unit 1072 inputs the frequency-direction interpolation result to a time-direction interpolation unit 1074 to be described below. In the case of selecting the time-direction interpolation result, the selection unit 1072 inputs the time-direction interpolation result to a time-direction interpolation unit 1076 to be described below. For example, if the input interpolation method is the interpolation method 1, the selection unit 1072 selects the time-direction interpolation result. On the other hand, if the input interpolation method is the interpolation method 2, the selection unit 1072 selects the frequency-direction interpolation result.

The transmission channel estimation unit 106 includes the time-direction interpolation unit 1074. Based on the frequency-direction interpolation result input from the selection unit 1072, the time-direction interpolation unit 1074 performs interpolation in the time direction to estimate transmission channel characteristics, and then inputs the estimated transmission channel characteristics to a selection unit 1078.

The transmission channel estimation unit 106 includes the frequency-direction interpolation unit 1076. Based on the time-direction interpolation result input from the selection unit 1072, the frequency-direction interpolation unit 1076 performs interpolation in the frequency direction to estimate transmission channel characteristics, and then inputs the estimated transmission channel characteristics to the selection unit 1078.

The transmission channel estimation unit 106 includes the selection unit 1078. Based on the interpolation method input from the arrangement and selection unit 114, the selection unit 1078 selects either one of the estimation result of the transmission channel characteristics input from the time-direction interpolation unit 1074 and the estimation result of the transmission channel characteristics input from the frequency-direction interpolation unit 1076. Then, the selection unit 1078 inputs the selected estimation result to the complex division unit 1080. For example, if the input interpolation method is the interpolation method 1, the selection unit 1078 selects the estimation result of the transmission channel characteristics input from the frequency-direction interpolation unit 1076. On the other hand, if the input interpolation method is the interpolation method 2, the selection unit 1078 selects the estimation result of the transmission channel characteristics input from the time-direction interpolation unit 1074.

The transmission channel estimation unit 106 includes the complex division unit 1080. Based on the estimation result of the transmission channel characteristics, the complex division unit 1080 estimates transmitted symbols, which are then input to the decode unit 10.

Figure 12:
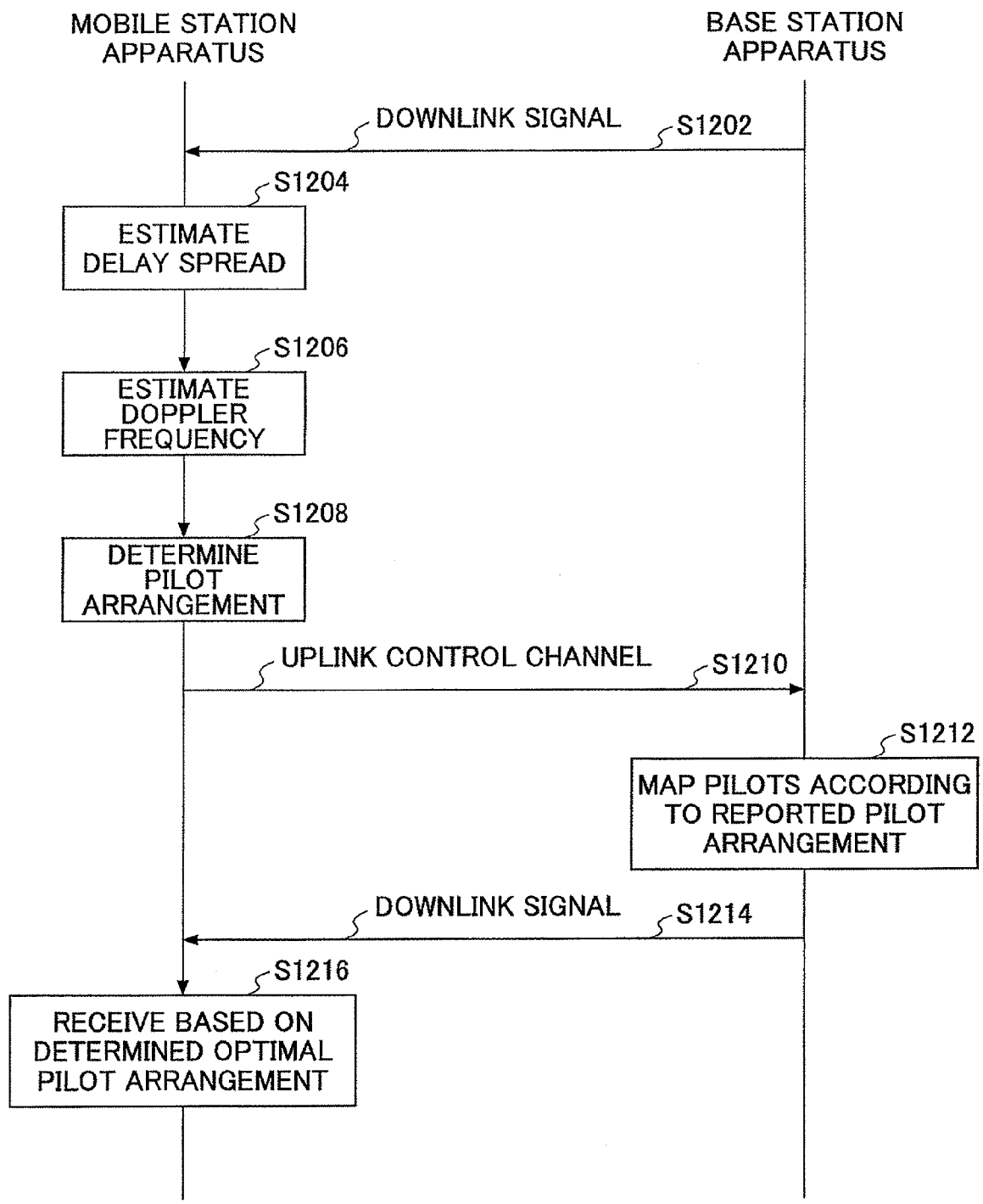
FIG. 12 is a flowchart showing an operation of the mobile communications system according to an embodiment.

The operation of the mobile communications system of the present embodiment is described below with reference to FIG. 12.

The base station apparatus 200 transmits a downlink signal (Step S1202). The downlink signal includes pilots. The arrangement of the pilots to be transmitted may be, for example, predetermined between the mobile station apparatus 100 and the base station apparatus 200.

Based on the downlink signal transmitted by the base station apparatus 200, the mobile station apparatus 100 estimates the delay spread of the transmission channel (Step S1204). For example, the Df-ds estimation unit 112 estimates the delay spread of the transmission channel based on the pilots included in the downlink signal.

The mobile station apparatus 100 estimates the Doppler frequency based on the downlink signal transmitted by the base station apparatus 200 (Step S1206). For example, the Df-ds estimation unit 112 estimates the Doppler frequency based on the pilots included in the downlink signal.

Based on the estimated delay spread and Doppler frequency, the mobile station apparatus 100 determines an optimal pilot arrangement according to the above-described method (Step S1208). For example, the arrangement and selection unit 114 may change the pilot arrangement if the above relational expressions (5) and (6) are satisfied in neither the interpolation method 1 nor 2. The pilot arrangement may be changed by increasing or decreasing the number of pilots. The case where the number of pilots having been reduced at a given time is changed back to the original number is considered as a case of increasing the number of pilots. Also, the case where the number of pilots having been increased at a given time is changed back to the original number is considered as a case of decreasing the number of pilots.

The mobile station apparatus 100 reports information indicating the determined pilot arrangement to the base station apparatus 200 (Step S1210). For example, the control channel encode unit 116 encodes the information indicating the pilot arrangement determined by the arrangement and selection unit 114. The encoded information is, as an uplink control channel, multiplexed with uplink data by the multiplexing unit 118. The multiplexed information is modulated by the modulation unit 120, and then transmitted by the radio transmission unit 122.

The base station apparatus 200 maps pilots in the downlink signal in accordance with the pilot arrangement reported by the mobile station apparatus 100 (Step S1212), and then transmits the downlink signal (Step S1214).

The mobile station apparatus 100 receives the downlink signal transmitted by the base station apparatus 200 based on the pilot arrangement determined in Step S1208 (Step S1216). For example, the transmission channel estimation unit 106 estimates the transmission channel based on the pilot arrangement determined by the arrangement and selection unit 114. The compensation unit 108 makes compensation to the downlink signal based on the transmission channel estimated by the transmission channel estimation unit 106, and the decode unit 110 then decodes the downlink signal.

Figure 13:
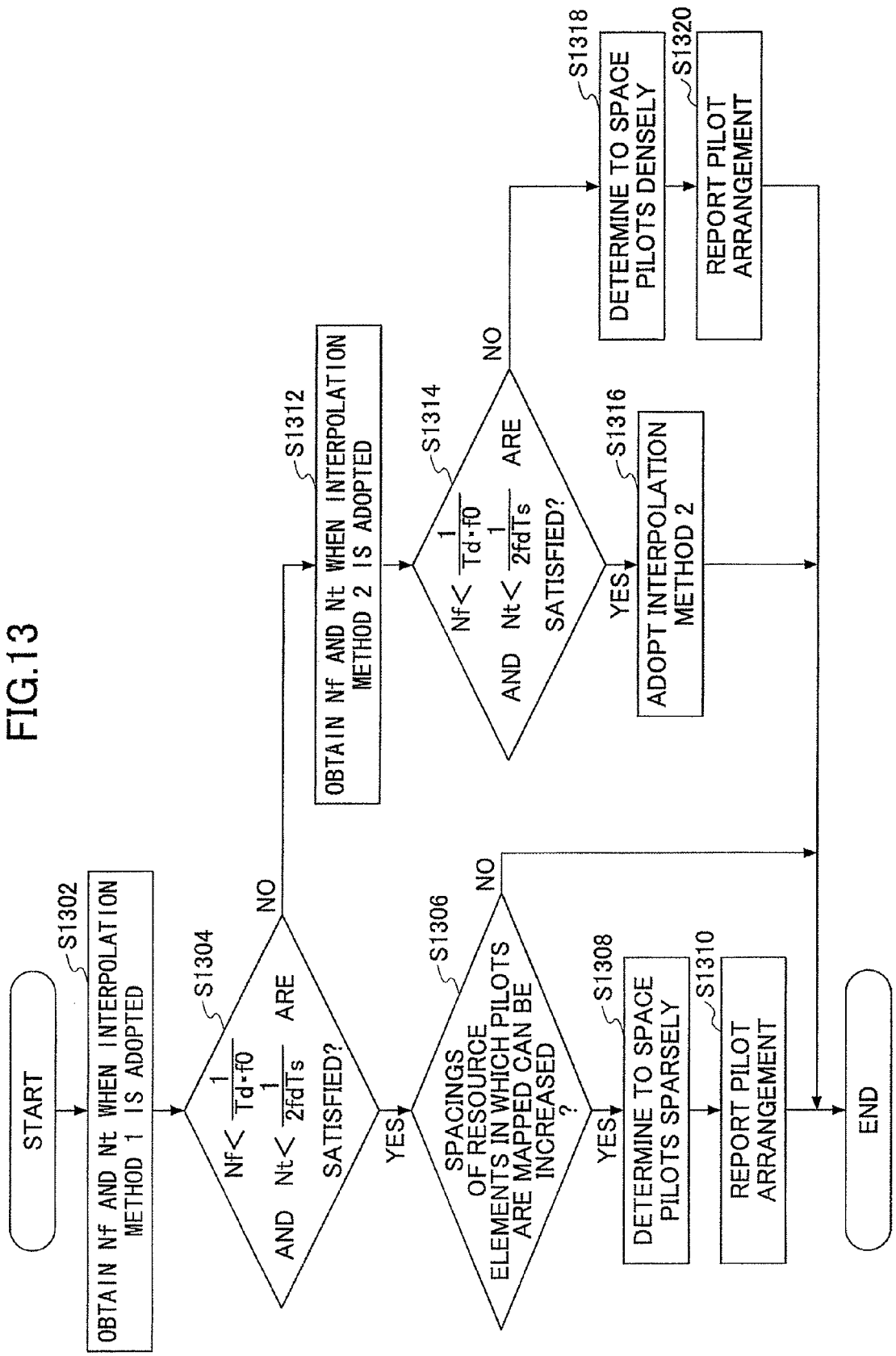
FIG. 13 is a flowchart showing an operation of the mobile station apparatus according to an embodiment.

The operation of the mobile station apparatus 100 of the present embodiment is described below with reference to FIG. 13.

Based on the pilot arrangement, the mobile station apparatus 100 obtains the resource element spacings Nf and Nt with which transmission channel characteristics in the frequency and time directions are obtained when interpolation is performed using the interpolation method 1 (Step S1302). This step may be performed by, for example, the arrangement and selection unit 114.

Based on the estimated Doppler frequency and delay spread of the transmission channel, the mobile station apparatus 100 determines whether the resource element spacings Nf and Nt of the interpolation method 1 satisfy the relational expressions (5) and (6) (Step S1304). This step may be performed by, for example, the arrangement and selection unit 114.

If determining that the relational expressions (5) and (6) are satisfied (Step S1304: YES), the mobile station apparatus 100 determines to adopt the interpolation method 1. Then, the mobile station apparatus 100 determines whether the frequency-direction spacing and/or the time-direction spacing of resource elements in which pilots are mapped can be increased (Step S1306). The process of increasing the frequency-direction spacing and/or the time-direction spacing of resource elements in which pilots are mapped may include a process of decreasing the number of the pilots to be mapped. For example, the arrangement and selection unit 114 may determine whether the relational expressions (5) and (6) can be still satisfied if the frequency-direction spacing and/or the time-direction spacing of resource elements in which pilots are mapped is increased.

If determining that the frequency-direction spacing and/or the time-direction spacing can be increased (Step S1306:

YES), the mobile station apparatus 100 determines to space the pilots more sparsely in such a manner (Step S1308). This step may be performed by, for example, the arrangement and selection unit 114.

The mobile station apparatus 100 inputs information indicating the pilot arrangement to the control channel encode unit 116. Then, the information is transmitted to the base station apparatus 200 (Step S1310). On the other hand, if determining that the frequency-direction spacing and/or the time-direction spacing cannot be increased (Step S1306: NO), the mobile station apparatus 100 ends the processing operation without changing the pilot arrangement.

If determining that the relational expressions (5) and (6) are not satisfied (Step S1304: NO), the mobile station apparatus 100 obtains the resource element spacings Nf and Nt with which transmission channel characteristics in the frequency and time directions are obtained when interpolation is performed using the interpolation method 2 (Step S1312). This step may be performed by, for example, the arrangement and selection unit 114.

The mobile station apparatus 100 determines the resource element spacings Nf and Nt of the interpolation method 2 satisfy the relational expressions (5) and (6) (Step S1314). This step may be performed by, for example, the arrangement and selection unit 114.

If determining that the relational expressions (5) and (6) are satisfied (Step S1314: YES), the mobile station apparatus 100 determines to adopt the interpolation method 2 (Step S1316). On the other hand, if determining that the relational expressions (5) and (6) are not satisfied (Step S1314: NO), the mobile station apparatus 100 determines to space the pilots more densely (Step S1318). This step may be performed by, for example, the arrangement and selection unit 114. Spacing the pilots more densely may involve a process of increasing the number of pilots.

The mobile station apparatus 100 inputs information indicating the pilot arrangement to the control channel encode unit 116. Then, the information is transmitted to the base station apparatus 200 (Step S1320).

According to the present embodiment, in the mobile communications system to which the scattered pilot scheme is applied, the mobile station apparatus is capable of dynamically selecting the processing order of the time-direction interpolation process and the frequency-direction interpolation process, based on the tolerances of the delay spread and the Doppler frequency. Herewith, it is possible to change the pilot arrangement dynamically and efficiently.

In the case where an allowable delay spread of the transmission channel and an allowable Doppler frequency cannot be obtained regardless of whether the time-direction interpolation or the frequency-direction interpolation is performed first, the mobile station apparatus 100 determines to rearrange the scattered pilots. The rearrangement of the scattered pilots may be achieved by changing in the time-direction spacing and/or the frequency-direction spacing. Such rearrangement of the scattered pilots includes a process of increasing or decreasing the frequency-direction spacing and/or the time-direction spacing of resource elements in which pilots are mapped. In addition, one of the frequency-direction spacing and the time-direction spacing may be increased while the other one may be decreased. In addition, the rearrangement of the scattered pilots may be achieved by a process of increasing or decreasing the number of pilots to be mapped. Herewith, it is possible to change the pilot arrangement dynamically and efficiently. Also, the mobile station apparatus may be designed not to apply the scattered pilot scheme in the case where an allowable delay spread of the transmission channel and an allowable Doppler frequency cannot be obtained regardless of whether the time-direction interpolation or the frequency-direction interpolation is performed first.

Since the present embodiment allows pilots to be arranged efficiently in accordance with the Doppler frequency and the delay spread of the transmission channel, more symbols and subcarriers can be allocated to data, whereby the throughput can be improved.

(b) Second Embodiment

The mobile communications system of the second embodiment is described next. The mobile communications system of the present embodiment is the same as the mobile communications system described below with reference to FIG. 6.

The mobile station apparatus 100 of the present embodiment is the same as the mobile station apparatus 100 described below with reference to FIGS. 7 and 11.

The mobile station apparatus 100 of the present embodiment selects the interpolation method based on an estimated Doppler frequency. For example, if the Doppler frequency is equal to or higher than a predetermined threshold, the interpolation method 1 is adopted. If the Doppler frequency is lower than the predetermined threshold, the interpolation method 2 is adopted. The threshold may be determined based on the frequency-direction spacing and/or the time-direction spacing of resource elements in which pilots are mapped, the subcarrier frequency spacing f0, and the symbol length of OFDM Ts.

In the above-described embodiment, the selection between the interpolation methods 1 and 2 may be made based on the delay spread of the transmission channel.

In the above-described embodiment, the selection between the interpolation methods 1 and 2 may be made based on both the Doppler frequency and the delay spread of the transmission channel.

According to the present embodiment, the interpolation method can be selected based on the Doppler frequency and/or the delay spread of the transmission channel, whereby the amount of calculation required to make the selection can be reduced. In other words, it is possible to reduce the processing load of the mobile station apparatus 100.

The pilot arrangements illustrated in the above embodiments are merely examples, and they can be changed accordingly.

All examples and conditional language used herein are intended for pedagogical purposes to aid the reader in understanding the principles of the present disclosures and the concepts contributed by the inventor to furthering the art, and are to be construed as being without limitation to such specifically recited examples and conditions, nor does the organization of such examples in the specification relate to a showing of the superiority or inferiority of the present disclosures. Although the embodiments of the present disclosures have been described in detail, it should be understood that various changes, substitutions, and alterations could be made hereto without departing from the spirit and scope of the present disclosures.

What is claimed is:

1. A mobile station apparatus, comprising:
 a first estimation unit configured to estimate a delay spread of a transmission channel and a Doppler frequency based on a downlink signal including pilots received from a base station apparatus;
 a determination unit configured to select, based on the delay spread and the Doppler frequency, an interpolation method to be applied to the pilots from a first interpolation method and a second interpolation method, the first interpolation method performing time-direction interpolation and then performing frequency-direction interpolation using a result of the time-direction interpolation, the second interpolation method performing frequency-direction interpolation and then performing time-direction interpolation using a result of the frequency-direction interpolation of the second interpolation method; and a second estimation unit configured to perform interpolation using the selected interpolation method to estimate the transmission channel, wherein the determination unit obtains a first frequency-direction resource element spacing, with which transmission channel characteristics in a frequency direction are obtained if one of the first and the second interpolation methods is applied, and a first time-direction resource element spacing, with which transmission channel characteristics in a time direction are obtained if the one of the first and the second interpolation methods is applied, and determines the one of the first and the second interpolation methods as the interpolation method to be applied if the first frequency-direction resource element spacing and the first time-direction resource element spacing satisfy a condition that allows the interpolation to be performed.

2. The mobile station apparatus as claimed in claim 1, wherein the pilots are assigned to subcarriers in such a manner that pilot-assigned subcarriers in one symbol are different from pilot-assigned subcarriers in a symbol immediately preceding the one symbol.

3. The mobile station apparatus as claimed in claim 1, further comprising:

a transmission part configured to transmit an uplink signal to the base station apparatus, wherein the determination unit obtains the frequency-direction resource element spacing and the time-direction resource element spacing on an assumption that the pilots included in the downlink signal are spaced more sparsely, and determines to space the pilots more sparsely if the frequency-direction resource element spacing and the time-direction resource element spacing still satisfy the condition, and the transmission part is configured to transmit the uplink signal including information indicating the determination by said determination unit that the pilots are to be spaced more sparsely to the base station apparatus.

4. The mobile station apparatus as claimed in claim 1, wherein if the first frequency-direction resource element spacing and the first time-direction resource element spacing do not satisfy the condition that allows the interpolation to be performed, the determination unit obtains a second frequency-direction resource element spacing, with which transmission channel characteristics in the frequency direction are obtained if the other one of the first and the second interpolation methods is applied, and a second time-direction resource element spacing, with which transmission channel characteristics in the time direction are obtained if the other one of the first and the second interpolation methods is applied; and the determination unit determines the other one of the first and the second interpolation methods as the interpolation method to be applied if the second frequency direction resource element spacing and the second time-direction resource element spacing satisfy the condition.

5. The mobile station apparatus as claimed in claim 1, further comprising:

a transmission part configured to transmit an uplink signal to the base station apparatus, wherein if the first frequency-direction resource element spacing and the first time-direction resource element spacing do not satisfy the condition that allows the interpolation to be performed, the determination unit obtains a second frequency-direction resource element spacing, with which transmission channel characteristics in the frequency direction are obtained if the other one of the first and the second interpolation methods is applied, and a second time-direction resource element spacing, with which transmission channel characteristics in the time direction are obtained if the other one of the first and the second interpolation methods is applied; and the determination unit determines to change an arrangement of the pilots if the second frequency-direction resource element spacing and the second time-direction resource element spacing do not satisfy the condition, and the transmission part is configured to transmit the uplink signal including information indicating the changed arrangement of the pilots to the base station apparatus.

6. The mobile station apparatus as claimed in claim 5, wherein the change of the arrangement of the pilots is to space the pilots more densely.

7. The mobile station apparatus as claimed in claim 1, wherein a condition that allows the interpolation to be performed is defined by $$Nf<1/(Td \cdot f0)$$

$$Nt<1/(2fd \cdot Ts)$$

where Td is the delay spread of the transmission channel, fd is the Doppler frequency, Nf is a frequency-direction resource element spacing with which transmission channel characteristics in the frequency direction are obtained if the interpolation method is applied, Nt is a time-direction resource element spacing with which transmission channel characteristics in the time direction are obtained if the interpolation method is applied, f0 is a subcarrier frequency spacing, and Ts is a symbol length of OFDM.

8. A transmission channel estimation method comprising the steps of:

estimating, by a mobile station apparatus, a delay spread of a transmission channel and a Doppler frequency based on a downlink signal including pilots;

selecting, based on the delay spread and the Doppler frequency by the mobile station apparatus, an interpolation method to be performed on the pilots from a first interpolation method and a second interpolation method, the first interpolation method performing time-direction interpolation and then performing frequency-direction interpolation using a result of the time-direction interpolation, the second interpolation method performing frequency-direction interpolation and then performing time-direction interpolation using a result of the frequency-direction interpolation of the second interpolation method; and performing, by the mobile station apparatus, interpolation by the selected interpolation method to estimate the transmission channel, wherein said selecting obtains a first frequency-direction resource element spacing, with which transmission channel characteristics in a frequency direction are obtained if one of the first and the second interpolation methods is applied, and a first time-direction resource element spacing, with which transmission channel characteristics in a time direction are obtained if the one of the first and the second interpolation methods is applied, and determines the one of the first and the second interpolation methods as the interpolation method to be applied if the first frequency-direction resource element spacing and the first time-direction resource element spacing satisfy a condition that allows the interpolation to be performed.

9. The transmission channel estimation method as claimed in claim 8, wherein the pilots are assigned to subcarriers in such a manner that pilot-assigned subcarriers in one symbol are different from pilot-assigned subcarriers in a symbol immediately preceding the one symbol.

* * * * *